(12) United States Patent
Takamatsu

(10) Patent No.: US 8,879,495 B2
(45) Date of Patent: Nov. 4, 2014

(54) BASE STATION AND COMMUNICATION METHOD OF BASE STATION

(75) Inventor: Nobuaki Takamatsu, Koto-ku (JP)

(73) Assignee: KYOCERA Corporation, Kyoto (JP)

( * ) Notice: Subject to any disclaimer, the term of this patent is extended or adjusted under 35 U.S.C. 154(b) by 155 days.

(21) Appl. No.: 13/699,666

(22) PCT Filed: May 25, 2011

(86) PCT No.: PCT/JP2011/002915
§ 371 (c)(1),
(2), (4) Date: Nov. 23, 2012

(87) PCT Pub. No.: WO2011/148632
PCT Pub. Date: Dec. 1, 2011

(65) Prior Publication Data
US 2013/0064147 A1    Mar. 14, 2013

(30) Foreign Application Priority Data
May 27, 2010    (JP) .................................. 2010-121863

(51) Int. Cl.
H04W 72/04    (2009.01)
H04W 16/28    (2009.01)
H04B 7/06    (2006.01)

(52) U.S. Cl.
CPC ............. *H04W 16/28* (2013.01); *H04B 7/0617* (2013.01); *H04W 72/046* (2013.01)
USPC ........................................ 370/329; 455/450

(58) Field of Classification Search
None
See application file for complete search history.

(56) References Cited

U.S. PATENT DOCUMENTS

| | | | | |
|---|---|---|---|---|
| 2008/0247340 | A1* | 10/2008 | Choi et al. | 370/281 |
| 2010/0322115 | A1* | 12/2010 | Wei et al. | 370/280 |
| 2011/0216675 | A1* | 9/2011 | Li et al. | 370/280 |
| 2011/0243262 | A1* | 10/2011 | Ratasuk et al. | 375/260 |
| 2011/0286412 | A1 | 11/2011 | Mochida et al. | |
| 2013/0010677 | A1* | 1/2013 | Youn et al. | 370/315 |

FOREIGN PATENT DOCUMENTS

WO    2010/053019 A1    5/2010

OTHER PUBLICATIONS

3GPP TS 36.211 V9.1.0 (Mar. 2010); 3rd Generation Partnership Project; Technical Specification Group Radio Access Network; Evolved Universal Terrestrial Radio Access (E-UTRA); Physical Channels and Modulation (Release 9).

(Continued)

*Primary Examiner* — Hassan Phillips
*Assistant Examiner* — Duc Duong
(74) *Attorney, Agent, or Firm* — Studebaker & Brackett PC

(57) ABSTRACT

Appropriate AAS control is achieved by a base station having a plurality of antennas for performing a radio communication with the mobile station by employing Time Division Duplex including an assignment unit for assigning a radio resource to the mobile station, a request unit for requesting the mobile station to transmit a reference signal using a reference signal area of an uplink radio resource in the same frequency band as a downlink radio resource, when the uplink radio resource for an uplink communication in the same frequency band as the downlink radio resource for a downlink communication is not assigned to the mobile station by the assignment unit, and a calculation unit for receiving the reference signal and, based on the reference signal, for calculating a weight used for transmitting a radio signal on the downlink communication channel.

5 Claims, 6 Drawing Sheets

(56) References Cited

OTHER PUBLICATIONS

3GPP TS 36.211 V8.7.0 (May 2009); 3rd Generation Partnership Project; Technical Specification Group Radio Access Network; Evolved Universal Terrestrial Radio Access (E-UTRA); Physical Channels and Modulation (Release 8).

International Search Report; PCT/JP2011/002915; Jul. 5, 2011.

* cited by examiner

FIG. 6

| SUBFRAME NUMBER | 0 DL | 1 S | 2 UL | 3 UL | 4 DL | 5 DL | 6 S | 7 UL | 8 UL | 9 UL |
|---|---|---|---|---|---|---|---|---|---|---|
| RB50 | | | | | MOBILE STATION A | | | | | |
| RB49 | | | | | MOBILE STATION A | | | | | |
| RB48 | | | | | MOBILE STATION A | | | | | |
| RB47 | | | | | MOBILE STATION A | | | | | |
| ... | ... | ... | ... | ... | ... | ... | ... | ... | ... | ... |
| RB26 | | | | | MOBILE STATION A | | | | | |
| RB25 | | | MOBILE STATION A | | MOBILE STATION A | | | | | |
| ... | ... | ... | ... | ... | ... | ... | ... | ... | ... | ... |
| RB3 | | | | | MOBILE STATION A | | | | | |
| RB2 | | | | | MOBILE STATION A | | | | | |
| RB1 | | | | | MOBILE STATION A | | | | | |

BASE STATION AND COMMUNICATION METHOD OF BASE STATION

CROSS REFERENCE TO RELATED APPLICATION

This application claims priority to and the benefit of Japanese Patent Application No. 2010-121863 (filed on May 27, 2010), the entire contents of which are incorporated herein by reference.

TECHNICAL FIELD

The present invention relates to a base station and a communication method of the base station.

BACKGROUND ART

A standards body of mobile communication methods, 3GPP, has recently been deliberating about LTE (Long Term Evolution). Especially for the LTE employing TDD (Time Division Duplex), introduction of AAS (Adaptive Antenna System) has been considered. The AAS changes radio wave directionality by performing adaptive control of weighting on each of a plurality of antenna elements forming an array antenna in accordance with a transmission environment. An adaptive array base station that deals with the AAS, by using, in downlink transmission, an antenna weight calculated based on a reference signal (Reference Signal) transmitted from a mobile station, performs adaptive control such as beam forming, null steering and the like to a desired mobile station.

As illustrated in FIG. 4, a communication frame of the LTE employing the TDD has 10 subframes. Each of the subframes is categorized into a UL subframe for an uplink communication from the mobile station to the base station, a DL subframe for a downlink communication from the base station to the mobile station, and a Special subframe having both a UL area for the uplink communication and a DL area for the downlink communication in the subframe (for example, see Non-Patent Document 1).

Preferably, the AAS defines a pair of (correspondence relationship between) the UL subframe and the DL subframe, and uses the pair for the communication between the base station and the mobile station. This is because, when the base station receives the reference signal in the UL subframe transmitted from the mobile station, the base station may calculate an appropriate transmission weight based on the reference signal and perform the downlink communication with the DL subframe more efficiently.

FIG. 5 is a diagram illustrating a pair of the UL subframe and the DL subframe in detail. A subframe 2 serving as the UL subframe and a subframe 4 serving as the DL subframe are paired with each other and a resource block (radio communication channel) RB6 of each of them is assigned to a common mobile station. The subframe 2 serving as the UL subframe includes DRS (Demodulation Reference Signal) and SRS (Sounding Reference Signal) as symbols for transmitting the reference signal. The DRS is a reference signal transmitted in association with user data from the mobile station to the base station, and the SRS is a reference signal that may be transmitted without being associated with the user data. In a case of FIG. 5, since the subframe 2 serving as the UL subframe is assigned to the mobile station for transmitting the user data to the base station, the mobile station may transmit the reference signal to the base station by using the DRS of the resource block RB6 of the subframe 2. Upon receiving the reference signal, the base station may appropriately perform adaptive array control for the resource block RB6 of the subframe 4.

RELATED ART DOCUMENT

Non-Patent Document

Non-Patent Document 1: 3GPP TS36.211(V8.7.0), "Physical Channels and Modulation", May 2009

SUMMARY OF INVENTION

Technical Problem

In using conventional LTE, only when a pair of the UL subframe and the DL subframe is assigned to the common base station, the mobile station may transmit the reference signal for an adaptive array to the base station. That is, when a pair of the UL subframe and the DL subframe is not assigned to the common base station, the mobile station may not transmit the reference signal for the adaptive array to the base station.

FIG. 6 is a diagram illustrating an example of transmission of the reference signal by the conventional LTE. As illustrated in FIG. 6, the subframe 2 serving as the UL subframe and the subframe 4 serving as the DL subframe are paired with each other. Here, while resource blocks RB 1-50 in the subframe 4 are assigned to a mobile station A, one resource block RB25 in the subframe 2 is assigned to the mobile station A. In this case, the mobile station A may transmit the reference signal associated only with the resource block RB 25 and may mot transmit the reference signals associated with other resource blocks (RB 1-24 and RB 26-50). Therefore, the base station may not calculate the appropriate transmission weight of the reference signal for the resource blocks RB 1-24 and RB 26-50 in the subframe 4 for the mobile station A, which deteriorates transmission efficiency of the AAS. Especially the resource blocks RB 1-3 and RB 47-50 distant from the resource block RB 25 in terms of the frequency may not avoid a significant deterioration in the transmission efficiency.

Accordingly, an object of the present invention in consideration of such a condition is to provide a base station and a communication method of the base station capable of substantializing appropriate AAS control by making the mobile station transmit an appropriate reference signal.

Solution to Problem

In order to solve the above problem, a base station according to a first aspect of the present invention having a plurality of antennas for performing a radio communication with a mobile station by employing Time Division Duplex, includes:

an assignment unit configured to assign a radio communication channel to the mobile station;

a request unit configured to request the mobile station to transmit a reference signal, when an uplink radio communication channel for an uplink communication in the same frequency band as a downlink radio communication channel for a downlink communication is not assigned to the mobile station by the assignment unit, the reference signal using a reference signal area of the uplink radio communication channel in the same frequency band as the downlink radio communication channel; and a calculation unit configured to receive the reference signal and, based on the reference signal, to calculate a weight used for transmitting a radio signal on the downlink radio communication channel.

A second aspect of the present invention is the base station according to the first aspect, wherein, the assignment unit, when a size of transmission data to be transmitted to the mobile station exceeds a data size transmittable on one downlink radio communication channel, assigns the transmission data to a plurality of downlink radio communication channels at the same timing.

A third aspect of the present invention is the base station according to the first aspect, wherein, a communication frame includes a plurality of the radio communication channels in a frequency direction and also an uplink subframe having the reference signal area for the uplink communication and a subframe for the downlink communication in a time axis direction, and the assignment unit assigns the uplink radio communication channel of the uplink subframe and the downlink radio communication channel of the downlink subframe to the mobile station.

Although a device is used as a solution according to the present invention as described above, it should be understood that the present invention may also be substantialized by methods, programs and storage media storing programs, hence they are included in a scope of the present invention.

For example, as a method substantializing the present invention, a communication method of a base station having a plurality of antennas for performing a radio communication with a mobile station by employing Time Division Duplex according to a fourth aspect of the present invention, includes:

an assignment step for assigning the radio communication channel to the mobile station;

a request step for requesting the mobile station to transmit a reference signal, when an uplink radio communication channel for an uplink communication in the same frequency band as a downlink radio communication channel for a downlink communication station is not assigned to the mobile station by the assignment unit, the reference signal using a reference signal area of the uplink radio communication channel in the same frequency band as the downlink radio communication channel; and a calculation step for receiving the reference signal and, based on the reference signal, for calculating a weight used for transmitting a radio signal on the downlink radio communication channel.

A fifth aspect of the present invention is the communication method according to the fourth aspect, wherein at the assignment step, when a size of transmission data to be transmitted to the mobile station exceeds a data size transmittable on one downlink radio communication channel, the transmission data is assigned to a plurality of downlink radio communication channels at the same timing.

Effect of the Invention

According to the present invention, appropriate AAS control may be achieved by making the mobile station transmit an appropriate reference signal.

BRIEF DESCRIPTION OF DRAWINGS

FIG. 6 is a diagram illustrating an example of transmission of a reference signal according to conventional LTE.

DESCRIPTION OF EMBODIMENT

An embodiment of the present invention will be described with reference to the accompanying drawings.

Figure 1:
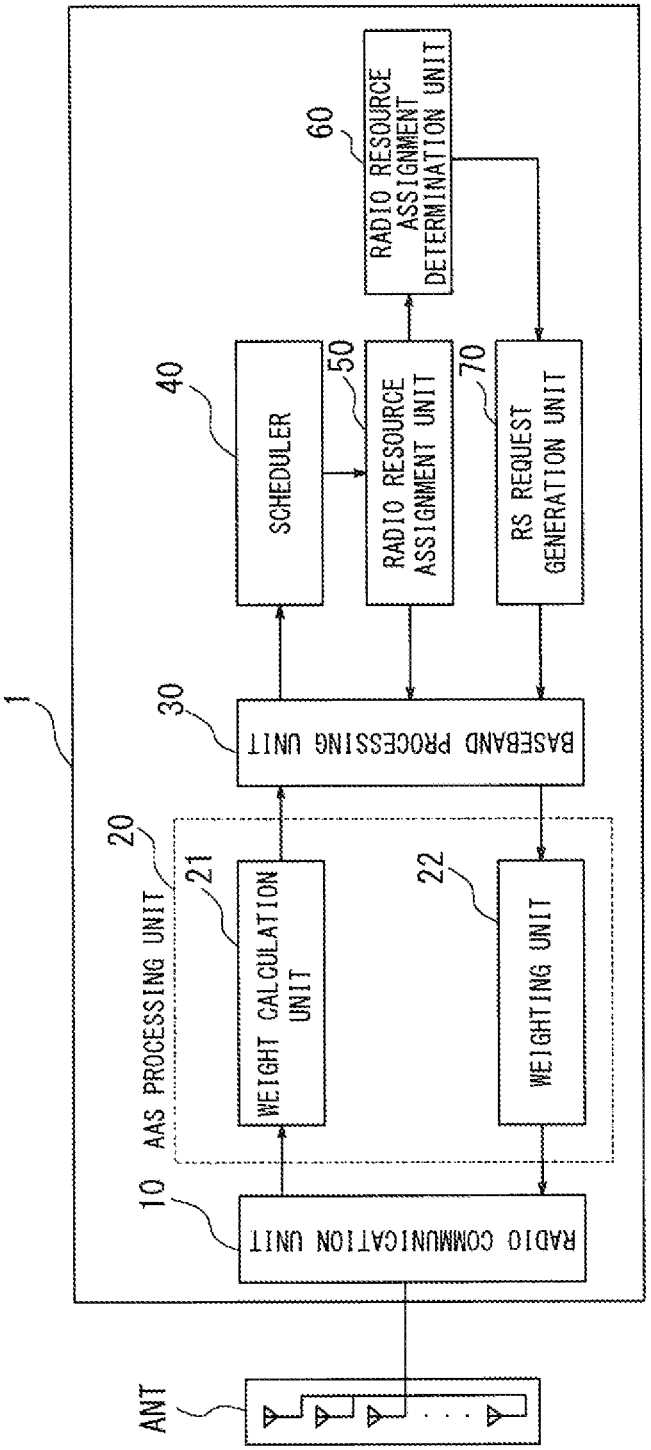
FIG. 1 is a functional block diagram illustrating a base station according to one embodiment of the present invention.

FIG. 1 is a diagram illustrating a schematic configuration of an adaptive array base station 1 employing LTE of TDD (Time Division Duplex) and having a plurality of antennas. The adaptive array base station 1 includes an array antenna ANT, a radio communication unit 10, an AAS processing unit 20 including a weight calculation unit (calculation unit) 21 and a weighting unit 22, a baseband processing unit 30, a scheduler 40, a radio resource assignment unit (assignment unit) 50, a radio resource assignment determination unit 60 and an RS (Reference Signal) request generation unit (request unit) 70. The radio communication unit 10, the AAS processing unit 20 and the baseband processing unit 30 may be configured by using an interface equipment/circuit suitable for the LTE, and the scheduler 40, the radio resource assignment unit 50, the radio resource assignment determination unit 60 and the RS request generation unit 70 may be configured by using suitable processors such as a CPU or the like. The following is a detailed description of each of the units.

The radio communication unit 10, as reception system processing, converts a radio signal at a carrier frequency received by the array antenna ANT into a radio signal at a baseband frequency and outputs the converted signal to the weight calculation unit 21. Also, the radio communication unit 10, as transmission system processing, converts a signal at the baseband frequency from the weighting unit 22 into a signal at the carrier frequency and transmits the signal to the mobile station via the array antenna ANT by performing adaptive array control.

The weight calculation unit 21 in a reception system of the AAS processing unit 20 performs adaptive signal processing to the signal input from the radio communication unit 10 and outputs the signal to the baseband unit 30. In detail, as the adaptive signal processing, the weight calculation unit 21, based on phase information obtained for each antenna element of the array antenna ANT by using a reference signal (Reference Signal) transmitted in the UL subframe from the mobile station and other known information, calculates a transmission weight (weighting of phase/amplitude of each antenna element) for the DL subframe paired with the UL subframe, such that high transmission gain to the mobile station may be obtained. On the other hand, the weighting unit 22 in a transmission system adds the transmission weight obtained by the weight calculation unit 21 to the signal input from the baseband unit 30 and outputs the signal to the radio communication unit 10.

The baseband processing unit 30, as the reception system processing, demodulates the signal input from the weight calculation unit 21 and outputs a result of the demodulation to the scheduler 40 separately for each mobile station. Also, the baseband processing unit 30, as the transmission system processing, outputs transmission data to be transmitted to the mobile station input from the radio resource assignment unit

50 and a symbol array of an RS request input from the RS request generation unit 70 to the weighting unit 22.

The scheduler 40, based on the data for each mobile station input from the baseband processing unit 30, determines a mobile station to assign a resource block (radio communication channel). In detail, the scheduler 40, based on quality of a received signal in each resource block informed from the mobile station, channel quality information (CQI) or an amount of data to be transmitted, determines the mobile station to assign the resource block.

The radio resource assignment unit 50 assigns the radio resource to the mobile station determined by the scheduler 40. The radio resource assignment unit 50, when a size of the transmission data to be transmitted to the mobile station exceeds a data size transmittable in one resource block (radio communication channel) of one downlink subframe, assigns the transmission data to a plurality of resource blocks of one downlink subframe. That is, when the transmission data to be transmitted to the mobile station is large in size, the radio resource assignment unit 50 assigns the radio resource such that as much data as possible may be transmitted in one downlink subframe to the mobile station.

The radio resource assignment determination unit 60, by referring to a result of assignment by the radio resource assignment unit 50, determines whether a pair of the UL subframe and the DL subframe is assigned to the mobile station. When a pair of the UL subframe and the DL subframe is assigned to the mobile station, the base station 1 may receive the reference signal necessary for the adaptive array control from the mobile station. Therefore, the radio resource assignment determination unit 60 does not transmit an RS request generating instruction to the RS request generation unit 70. On the other hand, when a pair of the UL subframe and the DL subframe is not assigned, the base station 1 may not receive the reference signal necessary for the adaptive array control from the mobile station. Therefore, the radio resource assignment determination unit 60 transmits the RS request generating instruction to the RS request generation unit 70.

Figure 3:
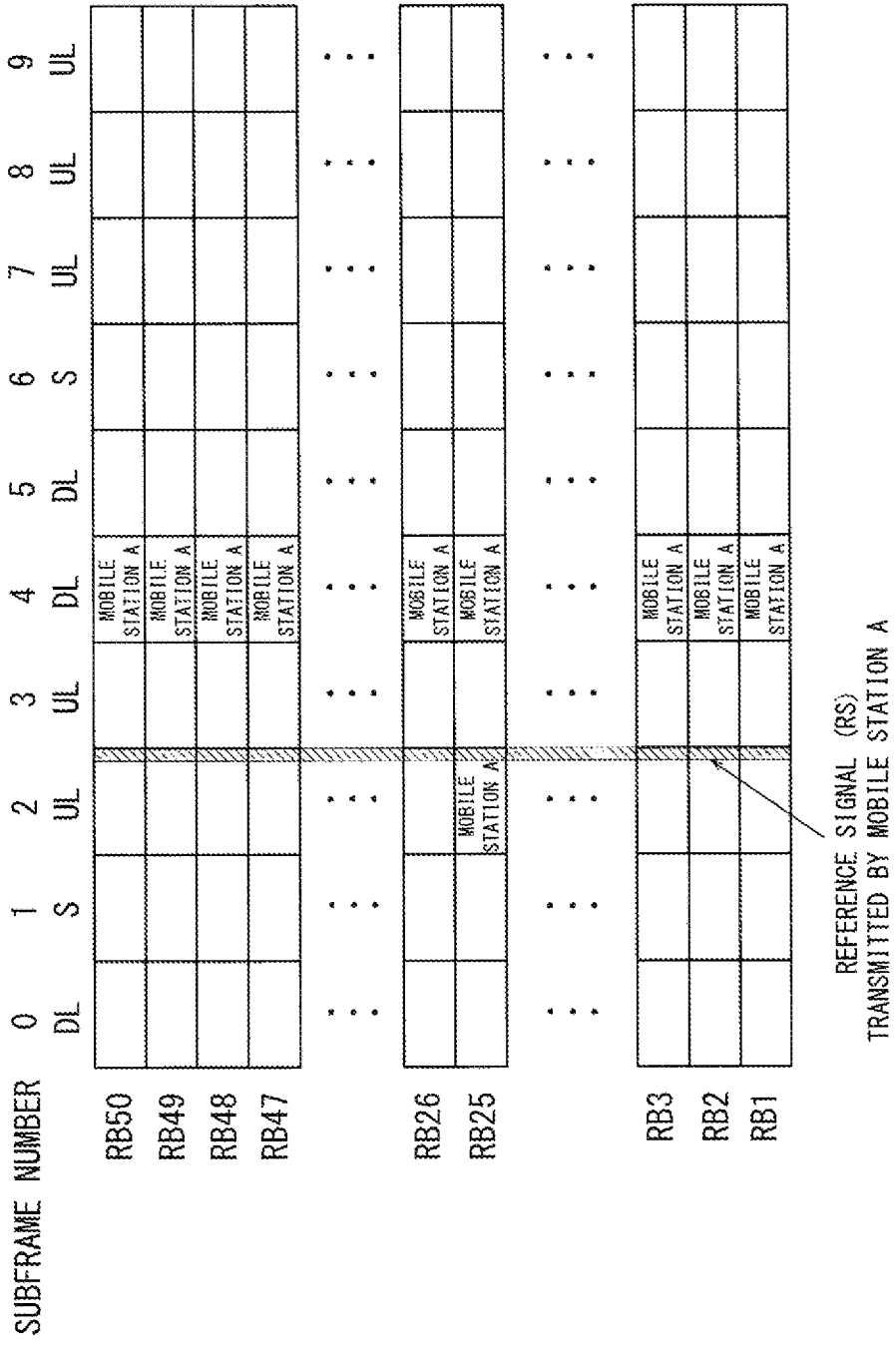
FIG. 3 is a diagram illustrating an example of transmission of a reference signal according to the embodiment of the present invention.
Figure 4:
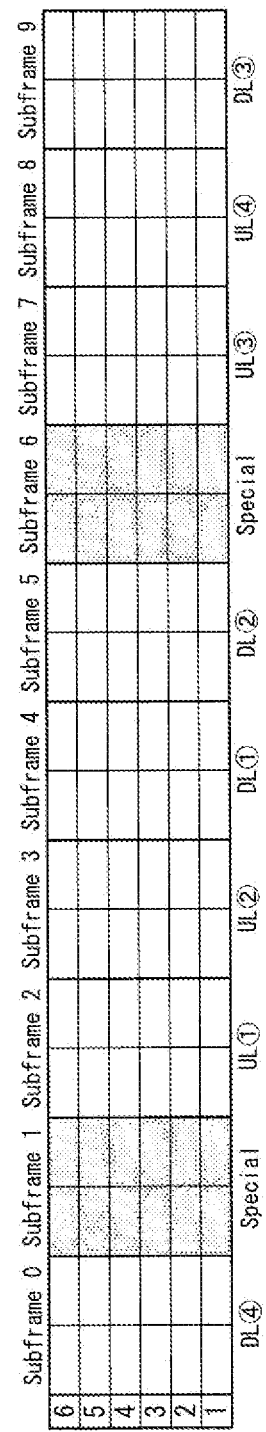
FIG. 4 is a diagram illustrating an exemplary configuration of a communication frame of LTE.
Figure 5:
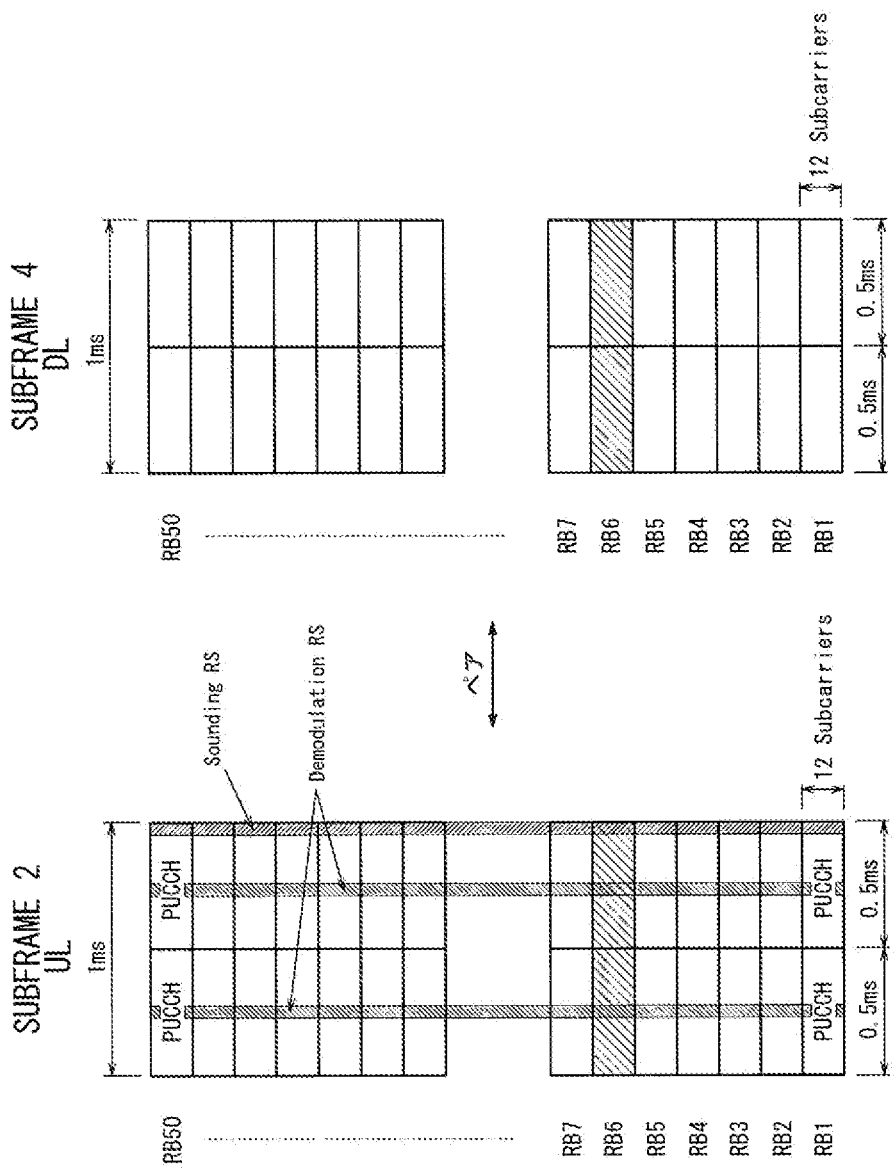
FIG. 5 is a diagram illustrating a pair of subframes in detail.

The RS request generation unit 70, upon receiving the RS request generating instruction from the radio resource assignment determination unit 60, generates an RS request for requesting the mobile station to transmit the reference signal and supplies the RS request to the baseband processing unit 30. The RS request, when only the DL subframe is assigned at a frequency (resource block) without a paired (corresponding and on the same frequency) UL subframe, requests the mobile station to transmit the reference signal using a reference signal area of SRS or the like of a paired UL subframe. FIG. 3 is a diagram illustrating an example of the reference signal transmitted by the mobile station having received the RS request. In FIG. 3, while resource blocks RB 1-50 in the subframe 4 are assigned to a mobile station A, one resource block RB 25 in the subframe 2 is assigned to the mobile station A. That is, in the resource blocks RB 1-24 and RB 26-50, only the DL subframe is assigned to the mobile station A and the paired UL subframe is not assigned. In this case, the RS request generation unit 70 generates the RS request for requesting the mobile station A to transmit the reference signal using the SRS (Sounding Reference Signal) in the resource blocks RB 1-24 and RB 26-50 of the subframe 2 as the UL subframe. Since the SRS does not need to be transmitted in association with user data, the mobile station A may transmit the reference signal in the resource block of the UL subframe which is not assigned to the mobile station A. Upon receiving the RS request from the base station 1, the mobile station A transmits the reference signal using the SRS (Sounding Reference Signal) in the resource block RB 25 of the subframe resource 2 assigned for an uplink communication and the resource blocks RB 1-24 and RB 26-50 of the subframe 2 specified by the RS request. The base station 1, by receiving the reference signal, may appropriately perform adaptive array control to the mobile station A not only in a frequency band of the resource block RB 25 but also in the frequency band of the resource blocks RB 1-50. Note that the RS request generation unit 70 may generate the RS request such that the mobile station A transmits the reference signal by using the DRS in the resource block RB 25 of the subframe 2 assigned for the uplink communication and the SRS in the resource blocks RB 1-24 and RB 26-50.

Figure 2:
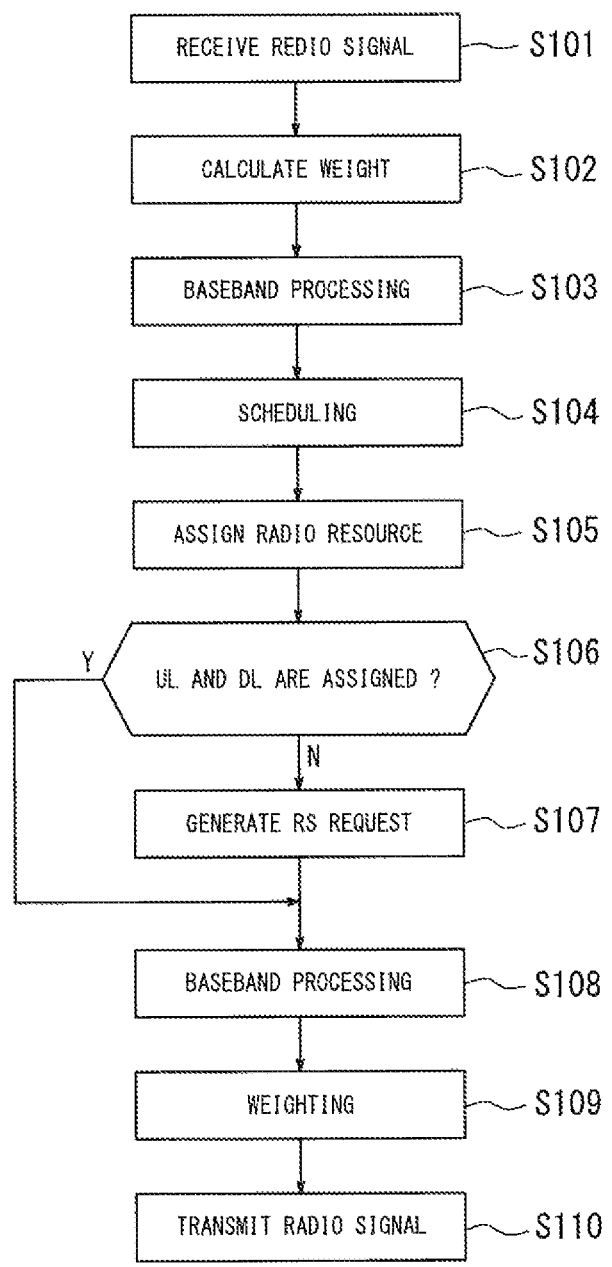
FIG. 2 is a flowchart of an operation of the base station illustrated in FIG. 1.

FIG. 2 is a flowchart of an operation of the base station 1 illustrated in FIG. 1. Upon receiving the radio signal from the mobile station via the array antenna ANT, the radio communication unit 10 converts the radio signal at the carrier frequency into the radio signal at the baseband frequency and outputs the signal to the weight calculation unit 21 (step S101). The weight calculation unit 21, based on the phase information of each antenna array of the array antenna ANT and the like by using the reference signal transmitted from the mobile station and other known information, calculates a transmission weight which enables to obtain high transmission gain to the mobile station (step S102). In detail, the weight calculation unit 21, based on the reference signal and the like transmitted in the UL subframe from the mobile station, calculates the transmission weight to the DL subframe paired with the UL subframe, such that high transmission gain to the mobile station may be obtained. The baseband processing unit 30 demodulates the signal input from the weight calculation unit 21 and outputs the result of the demodulation to the scheduler 40 separately for each mobile station (step S103).

The scheduler 40 determines the mobile station to assign the resource block based on the data received from each mobile station input from the baseband processing unit 30 (step S104). The radio resource assignment unit 50 assigns the radio resource to the mobile station determined by the scheduler 40 (step S105). The radio resource assignment unit 50, when a size of the transmission data to be transmitted to the mobile station exceeds the data size transmittable in one resource block of the downlink subframe, assigns the transmission data to a plurality of resource blocks of one downlink subframe.

The radio resource assignment determination unit 60, by referring to the result of assignment by the radio resource assignment unit 50, determines whether a pair of the UL subframe and the DL subframe is assigned to the mobile station (step S106). When a pair of the UL subframe and the DL subframe is assigned to the mobile station, the base station 1 may receive the reference signal necessary for the adaptive array control from the mobile station. Therefore, the radio resource assignment determination unit 60 does not transmit the RS request generating instruction to the RS request generation unit 70. On the other hand, when there is a subframe not paired with the UL subframe, the base station 1 may not receive the reference signal necessary for the adaptive array control from the mobile station for the DL subframe. Therefore, the radio resource assignment determination unit 60 transmits an RS request generating instruction to the RS request generation unit 70. The RS request generation unit 70, upon receiving the RS request generating instruction from the radio resource assignment determination unit 60, generates the RS request for requesting the mobile station to transmit the reference signal (step S107). The baseband processing unit 30 outputs the data to be transmitted to the mobile station input from the radio resource assignment unit 50 and the symbol array of the RS request input from the RS request generation unit 70 to the weighting unit 22 (step S108). The weighting unit 22 adds the transmission weight obtained by the weight calculation unit 21 to the signal input from the baseband unit 30 and outputs the signal to the radio communication unit 10 (step S109). The radio communication unit 10 converts the signal at the baseband frequency from the weighting unit 22 into the signal at the carrier frequency and transmits the signal to the mobile station via the antenna array ANT by performing the adaptive array control (step S110).

According to the present embodiment, when a pair of the UL subframe and the DL subframe is not assigned to the mobile station, the RS request generation unit 70 requests the mobile station to transmit the reference signal using the reference signal area such as the SRS of the UL subframe. Thereby, the base station 1 may receive an appropriate reference signal from the mobile station and appropriately perform AAS control for the downlink communication.

Also, the radio resource assignment unit 50, when the size of the transmission data to be transmitted to the mobile station exceeds the data size transmittable in one resource block (radio communication channel) of one downlink subframe, assigns the transmission data to a plurality of resource blocks of one downlink subframe. Thereby, data transmission to the mobile station may be completed with one downlink subframe and the base station 1 does not need to transmit the RS request more than one time. Further, since the mobile station may transmit all reference signals using the reference signal area in one UL subframe and the base station may receive the reference signal from the base station at one time, it is advantageous in terms of reduction in processing load and power consumption of the mobile station and the base station 1.

Although the present invention is described based on figures and the embodiment, it is to be understood that those who are skilled in the art may easily vary or alter in a multiple manner based on disclosure of the present invention. Accordingly, such variation and modification are included in a scope of the present invention. For example, the baseband processing unit 30 may have a function of the AAS processing unit 20 to calculate and add the weight in AAS. Also, a function or the like of each component or each step may be rearranged avoiding a logical inconsistency, such that a plurality of components or steps are combined or divided.

REFERENCE SIGNS LIST 1 adaptive array base station
10 radio communication unit
20 AAS processing unit
21 weight calculation unit
22 weighting unit
30 baseband processing unit
40 scheduler
50 radio resource assignment unit
60 radio resource assignment determination unit
70 RS request generation unit
ANT array antenna

The invention claimed is:

1. A base station having a plurality of antennas for performing a radio communication with a mobile station by employing Time Division Duplex, comprising:
   an assignment unit configured to assign a radio resource to the mobile station;
   a request unit configured to request the mobile station to transmit a reference signal, when an uplink radio resource for an uplink communication in the same frequency band as a downlink radio resource for a downlink communication is not assigned to the mobile station by the assignment unit, the reference signal using a reference signal area of the uplink radio resource in the same frequency band as the downlink radio resource; and
   a calculation unit configured to receive the reference signal and, based on the reference signal, to calculate a weight used for transmitting a radio signal on the downlink radio resource.

2. The base station according to claim 1, wherein the assignment unit, when a size of transmission data to be transmitted to the mobile station exceeds a data size transmittable on one downlink radio resource, assigns the transmission data to a plurality of downlink radio resources at the same timing.

3. The base station according to claim 1, wherein a communication frame includes a plurality of the radio resources in a frequency direction and also an uplink subframe having the reference signal area for the uplink communication and a subframe for the downlink communication in a time axis direction, and
   the assignment unit assigns the uplink radio resource of the uplink subframe and the downlink radio resource of the downlink subframe to the mobile station.

4. A communication method of a base station having a plurality of antennas for performing a radio communication with a mobile station by employing Time Division Duplex, comprising:
   an assignment step for assigning the radio resource to the mobile station;
   a request step for requesting the mobile station to transmit a reference signal, when an uplink radio resource for an uplink communication in the same frequency band as a downlink radio resource for a downlink communication is not assigned to the mobile station by the assignment unit, the reference signal using a reference signal area of the uplink radio resource in the same frequency band as the downlink radio resource; and
   a calculation step for receiving the reference signal and, based on the reference signal, for calculating a weight used for transmitting a radio signal on the downlink radio resource.

5. The communication method according to claim 4, wherein at the assignment step, when a size of transmission data to be transmitted to the mobile station exceeds a data size transmittable on one downlink radio resource, the transmission data is assigned to a plurality of downlink radio resources at the same timing.

* * * * *